United States Patent
Cohen

(10) Patent No.: US 8,036,123 B1
(45) Date of Patent: *Oct. 11, 2011

(54) INTEGRATED CIRCUIT FOR NETWORK STRESS TESTING

(75) Inventor: Yuval Cohen, Raanana, IL (US)

(73) Assignee: Marvell International Ltd., Hamilton (BM)

( * ) Notice: Subject to any disclaimer, the term of this patent is extended or adjusted under 35 U.S.C. 154(b) by 1056 days.

This patent is subject to a terminal disclaimer.

(21) Appl. No.: 11/031,984

(22) Filed: Jan. 7, 2005

Related U.S. Application Data

(60) Provisional application No. 60/642,483, filed on Jan. 7, 2005.

(51) Int. Cl.
*H04J 1/16* (2006.01)
*H04L 12/26* (2006.01)

(52) U.S. Cl. .................. 370/235; 370/230; 370/231

(58) Field of Classification Search .......... None
See application file for complete search history.

(56) References Cited

U.S. PATENT DOCUMENTS

| | | | |
|---|---|---|---|
| 5,936,940 A | 8/1999 | Marin et al. | |
| 5,991,830 A | 11/1999 | Beard et al. | |
| 6,327,274 B1 | 12/2001 | Ravikanth | |
| 6,570,850 B1 | 5/2003 | Gutierrez et al. | |
| 6,608,816 B1 | 8/2003 | Nichols | |
| 6,618,396 B1 | 9/2003 | Kondo | |
| 6,633,540 B1 * | 10/2003 | Raisanen et al. | 370/230.1 |
| 6,643,612 B1 | 11/2003 | Lahat et al. | |
| 6,700,876 B1 | 3/2004 | DiNicola et al. | |
| 6,731,631 B1 | 5/2004 | Chang et al. | |
| 6,731,638 B1 | 5/2004 | Ofek | |
| 6,766,389 B2 | 7/2004 | Hayter et al. | |
| 6,839,794 B1 | 1/2005 | Schober | |
| 6,865,675 B1 | 3/2005 | Epstein | |
| 6,904,014 B1 | 6/2005 | Gai | |
| 6,940,831 B1 | 9/2005 | Omi et al. | |
| 6,976,085 B1 | 12/2005 | Aviani et al. | |
| 6,996,062 B1 | 2/2006 | Freed et al. | |
| 7,088,677 B1 | 8/2006 | Burst, Jr. | |
| 7,222,255 B1 | 5/2007 | Claessens et al. | |
| 7,274,714 B2 | 9/2007 | Raisanen et al. | |
| 2001/0004352 A1 | 6/2001 | Watanabe | |
| 2002/0024973 A1 | 2/2002 | Tavana et al. | |
| 2002/0080791 A1 | 6/2002 | Sylvain | |
| 2002/0103937 A1 * | 8/2002 | Tillmann et al. | 709/246 |

(Continued)

FOREIGN PATENT DOCUMENTS

WO    WO 00/36793    6/2000

OTHER PUBLICATIONS

U.S. Patent Application No. (To Be Assigned), filed Jan. 7, 2005, entitled, "Integrated Circuit for Network Delay and Jitter Testing".

(Continued)

*Primary Examiner* — Raj Jain

(57) ABSTRACT

An integrated circuit having a corresponding method comprises a plurality of ports to transmit and receive packets of data; a forwarding engine to transfer the packets of data between the ports; and a controller to receive one or more packet definitions that specify characteristics of a packet; and wherein at least one of the ports comprises a packet generator to originate one or more packets of data according to one or more of the packet definitions received by the controller.

70 Claims, 10 Drawing Sheets

U.S. PATENT DOCUMENTS

| | | |
|---|---|---|
| 2003/0035371 A1 | 2/2003 | Reed et al. |
| 2003/0165160 A1 | 9/2003 | Minami |
| 2003/0172177 A1* | 9/2003 | Kersley et al. ............ 709/236 |
| 2003/0229485 A1 | 12/2003 | Nishikawa |
| 2005/0058083 A1 | 3/2005 | Rogers |
| 2005/0094643 A1* | 5/2005 | Wang et al. ............ 370/395.4 |
| 2005/0099952 A1 | 5/2005 | Mohan et al. |
| 2005/0157675 A1 | 7/2005 | Feder et al. |
| 2005/0243822 A1 | 11/2005 | Jain et al. |
| 2005/0270982 A1* | 12/2005 | McBeath ............ 370/252 |
| 2006/0227706 A1 | 10/2006 | Burst, Jr. |
| 2007/0147258 A1 | 6/2007 | Mottishaw et al. |

OTHER PUBLICATIONS

IEEE P802.1ag/D0.0, Draft Standard for Local and Metropolitan Area Networks, Virtual Bridged Local Area Networks—Amendment 5: Connectivity Fault Management; May 6, 2004, 72 pages.

* cited by examiner

INTEGRATED CIRCUIT FOR NETWORK STRESS TESTING

CROSS-REFERENCE TO RELATED APPLICATIONS

This application is related to copending Patent Application Ser. No. 60/642,483 entitled "Integrated Circuit for Network Delay And Jitter Testing," filed Jan. 7, 2005, the disclosure thereof incorporated by reference herein in its entirety.

BACKGROUND

The present invention relates generally to network testing. More particularly, the present invention relates to integrated circuits for stress testing a network.

Data networks are becoming increasingly important to all sectors of the economy. As the reliance on these data networks rises, so do the costs of network downtime or even less than optimal network performance. For these reasons, network testing, troubleshooting, and monitoring has also become increasingly important.

One approach to network testing is to purchase and deploy specialized network test equipment to test the network. One disadvantage of this approach is that such equipment is very expensive, especially when capable of testing very fast networks. Another disadvantage is that installing this specialized equipment to obtain meaningful measurements usually requires changing the network topology, possibly interfering with the normal operation of the network.

Another approach is to run network testing applications in existing network devices such as routers and the like that have built-in central processing units (CPUs). One disadvantage of this approach is that the network testing applications burden the CPUs and therefore reduce the performance of such network devices in their normal network roles. Furthermore, these CPUs are limited in performance relative to the number of ports and their speed in the network, and so cannot handle traffic at wirespeed.

SUMMARY

In general, in one aspect, the invention features an integrated circuit comprising a plurality of ports to transmit and receive packets of data; a forwarding engine to transfer the packets of data between the ports; and a controller to receive one or more packet definitions that specify characteristics of a packet; and wherein at least one of the ports comprises a packet generator to originate one or more packets of data according to one or more of the packet definitions received by the controller.

Particular implementations can include one or more of the following features. The at least one of the ports further comprises a network transmit interface to transmit the one or more packets of data originated by the packet generator. The at least one of the ports further comprises an egress queue to store the packets of data received by the at least one of the ports from the forwarding engine; a test queue to store the packets of data originated by the packet generator; and a scheduler comprising a first input in communication with the egress queue, a second input in communication with the test queue, and an output in communication with the network transmit interface. The one or more packet definitions comprise at least one of the group consisting of an address definition that specifies one or more addresses for the one or more packets of data to be originated by the packet generator; a load definition that specifies a number of the one or more packets of data to be originated by the packet generator; a protocol definition that specifies one or more network protocols for the one or more packets of data to be originated by the packet generator; a payload definition that specifies one or more data patterns for payloads of the one or more packets of data to be originated by the packet generator; a data rate definition that specifies one or more data rates at which the one or more packets of data to be originated by the packet generator are to be transmitted; and a quality of service definition that specifies one or more qualities of service for the one or more packets of data to be originated by the packet generator. The at least one of the ports further comprises a network receive interface to receive one or more packets of data representing a number of the one or more packets of data originated by the packet generator and transmitted by the network transmit interface that were received by one or more network devices; and wherein the controller determines a packet loss based on a number of the one or more packets of data originated by the packet generator and transmitted by the network transmit interface to the one or more network devices and the number of the one or more packets of data originated by the packet generator that were received by the one or more network devices. The controller determines the packet loss based on one or more properties of the one or more packets of data originated by the packet generator and transmitted by the network transmit interface. The one or more properties comprise at least one of the group consisting of a source address of the packet of data representing the number of the one or more packets of data originated by the packet generator and transmitted by the network transmit interface that were received by a network device; a destination address of the one or more packets of data originated by the packet generator and transmitted by the network transmit interface; and one or more qualities of service for the one or more packets of data originated by the packet generator and transmitted by the network transmit interface. The at least one of the ports further comprises a network receive interface to receive packets of data; and wherein the integrated circuit further comprises a classifier to identify the packets of data that were received by the network receive interface in reply to packets of data that were originated and transmitted by one of the ports in the integrated circuit, and a counter to count a number of the packets of data received by the network receive interface in reply to the one or more packets of data that were originated and transmitted by the one of the ports in the integrated circuit. The controller determines a packet loss based on a number of the packets of data that were originated and transmitted by the one of the ports in the integrated circuit and the number of the packets of data received by the network receive interface in reply to the one or more packets of data that were originated and transmitted by the one of the ports in the integrated circuit. The at least one of the ports further comprises an ingress queue to store the packets of data received by the network receive interface. The at least one of the ports further comprises a network receive interface to receive packets of data; and wherein the integrated circuit further comprises a classifier to determine one or more properties of the packets of data received by the network receive interface, and a counter to count a number of packets of data received by the network receive interface and having properties that match one or more property definitions. The at least one of the ports further comprises an ingress queue to store the packets of data received by the network receive interface. The one or more property definitions comprise at least one of the group consisting of a value for a field in the packets of data that indicates the packets of data were originated by one of the ports in the integrated circuit; and a value for a field in the packets of data that indicates the packets of data were originated by a port in another integrated circuit; and one or more qualities of service for the packets of data. The at least one of the ports receives a request for the contents of the counter; and transmits a packet of data comprising the contents of the counter. A network switch comprises the integrated circuit. An Ethernet switch comprises the network switch. A network device comprising the integrated circuit. The network device further comprises a user interface to provide the one or more packet definitions to the integrated circuit. A network device comprising the integrated circuit. The network device further comprises a user interface to provide the one or more property definitions to the integrated circuit, and to retrieve the contents of the counter.

In general, in one aspect, the invention features a method for an integrated circuit comprising transmitting and receiving packets of data on a plurality of ports of the integrated circuit; transferring the packets of data between the ports; receiving one or more packet definitions that specify characteristics of a packet; and originating one or more packets of data according to one or more of the packet definitions.

Particular implementations can include one or more of the following features. The method further comprises transmitting the one or more packets of data originated by the integrated circuit. The one or more packet definitions comprise at least one of the group consisting of an address definition that specifies one or more addresses for the one or more packets of data; a load definition that specifies a number of the one or more packets of data; a protocol definition that specifies one or more network protocols for the one or more packets of data; a payload definition that specifies one or more data patterns for payloads of the one or more packets of data; a data rate definition that specifies one or more data rates at which the one or more packets of data are to be transmitted; and a quality of service definition that specifies one or more qualities of service for the one or more packets of data. The method further comprises: receiving one or more packets of data representing a number of the one or more packets of data originated and transmitted by the integrated circuit that were received by one or more network devices; and determining a packet loss based on a number of the one or more packets of data originated and transmitted by the integrated circuit and the number of the one or more packets of data originated and transmitted to the one or more network devices by the integrated circuit that were received by the one or more network devices. The method further comprises: determining the packet loss based on one or more properties of the one or more packets of data originated and transmitted by the integrated circuit. The one or more properties comprise at least one of the group consisting of a source address of the packet of data representing the number of the one or more packets of data originated and transmitted by the integrated circuit that were received by a network device; a destination address of the one or more packets of data originated and transmitted by the integrated circuit; and one or more qualities of service for the one or more packets of data originated and transmitted by the integrated circuit. The method further comprises: receiving packets of data; and counting a number of the received packets of data that were received in reply to the one or more packets of data originated and transmitted by the integrated circuit. The method further comprises: determining a packet loss based on a number of the packets of data that were originated and transmitted by the integrated circuit and the number of received packets of data received in reply to the one or more packets of data originated and transmitted by the integrated circuit. The method further comprises: receiving packets of data; determining one or more properties of the received packets of data; and counting a number of the received packets of data having properties that match one or more property definitions. The one or more property definitions comprise at least one of the group consisting of: a value for a field in the packets of data that indicates the packets of data were originated by the integrated circuit; and a value for a field in the packets of data that indicates the packets of data were originated by another integrated circuit; and one or more qualities of service for the packets of data. The method further comprises: receiving a request for the number of packets of data received by the network receive interface that have properties that match the one or more property definitions; and transmitting a packet of data comprising the number of packets of data received by the network receive interface that have properties that match the one or more property definitions.

In general, in one aspect, the invention features an integrated circuit comprising: one or more ports to transmit and receive packets of data; a host interface to transmit and receive the packets of data; a controller to receive one or more packet definitions that specify characteristics of a packet; and wherein at least one of the ports comprises a packet generator to originate one or more packets of data according to one or more of the packet definitions received by the controller.

Particular implementations can include one or more of the following features. The at least one of the ports further comprises: a network transmit interface to transmit the one or more packets of data originated by the packet generator. The at least one of the ports further comprises: an egress queue to store the packets of data received by the at least one of the ports from the host interface; a test queue to store the packets of data originated by the packet generator; and a scheduler comprising a first input in communication with the egress queue, a second input in communication with the test queue, and an output in communication with the network transmit interface. The one or more packet definitions comprise at least one of the group consisting of: an address definition that specifies one or more addresses for the one or more packets of data to be originated by the packet generator; a load definition that specifies a number of the one or more packets of data to be originated by the packet generator; a protocol definition that specifies one or more network protocols for the one or more packets of data to be originated by the packet generator; a payload definition that specifies one or more data patterns for payloads of the one or more packets of data to be originated by the packet generator; a data rate definition that specifies one or more data rates at which the one or more packets of data to be originated by the packet generator are to be transmitted; and a quality of service definition that specifies one or more qualities of service for the one or more packets of data to be originated by the packet generator. The at least one of the ports further comprises: a network receive interface to receive one or more packets of data representing a number of the one or more packets of data originated by the packet generator and transmitted by the network transmit interface that were received by one or more network devices; and wherein the controller determines a packet loss based on a number of the one or more packets of data originated by the packet generator and transmitted by the network transmit interface to the one or more network devices and the number of the one or more packets of data originated by the packet generator and transmitted by the network transmit interface that were received by the one or more network devices. The controller determines the packet loss based on one or more properties of the one or more packets of data originated by the packet generator and transmitted by the network transmit interface. The one or more properties comprise at least one of the group consisting of: a source address of the packet of data representing the number of the one or more packets of data originated by the packet generator and transmitted by the network transmit interface that were received by a network device; a destination address of the one or more packets of data originated by the packet generator and transmitted by the network transmit interface; and one or more qualities of service for the one or more packets of data originated by the packet generator and transmitted by the network transmit interface. The at least one of the ports further comprises a network receive interface to receive packets of data; and wherein the integrated circuit further comprises a classifier to identify the packets of data that were received by the network receive interface in reply to packets of data that were originated and transmitted by one of the ports in the integrated circuit, and a counter to count a number of the one or more packets of data received by the network receive interface in reply to the packets of data that were originated and transmitted by the one of the ports in the integrated circuit. The controller determines a packet loss based on a number of the packets of data that were originated and transmitted by the one of the ports in the integrated circuit and the number of the packets of data received by the network receive interface in reply to the one or more packets of data that were originated and transmitted by the one of the ports in the integrated circuit. The at least one of the ports further comprises: an ingress queue to store the packets of data received by the network receive interface. The at least one of the ports further comprises a network receive interface to receive packets of data; and wherein the integrated circuit further comprises a classifier to determine one or more properties of the packets of data received by the network receive interface, and a counter to count a number of packets of data received by the network receive interface and having properties that match one or more property definitions. At least one of the ports further comprises: an ingress queue to store the packets of data received by the network receive interface. The one or more property definitions comprise at least one of the group consisting of: a value for a field in the packets of data that indicates the packets of data were originated by one of the ports in the integrated circuit; a value for a field in the packets of data that indicates the packets of data were originated by a port in another integrated circuit; and one or more qualities of service for the packets of data. The at least one of the ports: receives a request for the contents of the counter; and transmits a packet of data comprising the contents of the counter. A network interface controller (NIC) comprises. A network device comprises the integrated circuit. The network device further comprises: a user interface to provide the one or more packet definitions to the integrated circuit. A network device comprises the integrated circuit. The network device of further comprises: a user interface to provide the one or more property definitions to the integrated circuit, and to retrieve the contents of the counter.

In general, in one aspect, the invention features a method for an integrated circuit comprising: transmitting and receiving packets of data on one or more ports of the integrated circuit; transmitting and receiving packets of data on a host interface of the integrated circuit; receiving one or more packet definitions that specify characteristics of a packet; and originating one or more packets of data according to one or more of the packet definitions. The method further comprises: transmitting the one or more packets of data on one or more of the one or more ports. The one or more packet definitions comprise at least one of the group consisting of: an address definition that specifies one or more addresses for the one or more packets of data; a load definition that specifies a number of the one or more packets of data; a protocol definition that specifies one or more network protocols for the one or more packets of data; a payload definition that specifies one or more data patterns for payloads of the one or more packets of data; a data rate definition that specifies one or more data rates at which the one or more packets of data are to be transmitted; and a quality of service definition that specifies one or more qualities of service for the one or more packets of data. The method further comprises: receiving one or more packets of data representing a number of the one or more packets of data originated and transmitted by the integrated circuit that were received by one or more network devices; and determining a packet loss based on a number of the one or more packets of data originated and transmitted to the one or more network devices by the integrated circuit and the number of the one or more packets of data originated and transmitted by the integrated circuit that were received by the one or more network devices. The method further comprises: determining the packet loss based on one or more properties of the one or more packets of data originated and transmitted by the integrated circuit. The one or more properties comprise at least one of the group consisting of: a source address of the packet of data representing the number of the one or more packets of data originated and transmitted by the integrated circuit that were received by a network device; a destination address of the one or more packets of data originated and transmitted by the integrated circuit; and one or more qualities of service for the one or more packets of data originated and transmitted by the integrated circuit. The method further comprises: receiving packets of data; and counting a number of the received packets of data that were received in reply to the one or more packets of data originated and transmitted by the integrated circuit. The method further comprises: determining a packet loss based on a number of the packets of data that were originated and transmitted by the integrated circuit and the number of packets of data received in reply to the one or more packets of data originated and transmitted by the integrated circuit. The method further comprises: receiving packets of data; and determining one or more properties of the packets of data received by the integrated circuit, and counting a number of the packets of data received by the integrated circuit and having properties that match one or more property definitions. The one or more property definitions comprise at least one of the group consisting of: a value for a field in the packets of data that indicates the packets of data were originated by the integrated circuit; a value for a field in the packets of data that indicates the packets of data were originated by another integrated circuit; and one or more qualities of service for the packets of data. The method further comprises: receiving a request for the number of packets of data received by the integrated circuit that have properties that match the one or more property definitions; and transmitting a packet of data comprises the number of packets of data received by the integrated circuit that have properties that match the one or more property definitions.

In general, in one aspect, the invention features an integrated circuit comprising: a plurality of port means for transmitting and receiving packets of data; forwarding means for transferring the packets of data between the port means; and controller means for receiving one or more packet definitions that specify characteristics of a packet; and wherein at least one of the port means comprises packet generator means for originating one or more packets of data according to one or more of the packet definitions received by the controller means.

Particular implementations can include one or more of the following features. The at least one of the port means further comprises: network transmit interface means for transmitting the one or more packets of data originated by the packet generator means. The at least one of the port means further comprises: egress queue means for storing the packets of data received by the at least one of the port means from the forwarding means; test queue means for storing the packets of data originated by the packet generator means; and scheduler means comprises first input means for communicating with the egress queue means, second input means for communicating with the test queue means, and output means for communicating with the network transmit interface means. The one or more packet definitions comprise at least one of the group consisting of: an address definition that specifies one or more addresses for the one or more packets of data to be originated by the packet generator means; a load definition that specifies a number of the one or more packets of data to be originated by the packet generator means; a protocol definition that specifies one or more network protocols for the one or more packets of data to be originated by the packet generator means; a payload definition that specifies one or more data patterns for payloads of the one or more packets of data to be originated by the packet generator means; a data rate definition that specifies one or more data rates at which the one or more packets of data to be originated by the packet generator means are to be transmitted; and a quality of service definition that specifies one or more qualities of service for the one or more packets of data to be originated by the packet generator means. The at least one of the port means further comprises: network receive interface means for receiving one or more packets of data representing a number of the one or more packets of data originated by the packet generator means and transmitted by the network transmit interface means that were received by one or more network devices; and wherein the controller means determines a packet loss based on a number of the one or more packets of data originated by the packet generator means and transmitted by the network transmit interface means to the one or more network devices and the number of the one or more packets of data originated by the packet generator means that were received by the one or more network devices. The controller means determines the packet loss based on one or more properties of the one or more packets of data originated by the packet generator and transmitted by the network transmit interface means. The one or more properties comprise at least one of the group consisting of: a source address of the packet of data representing the number of the one or more packets of data originated by the packet generator means and transmitted by the network transmit interface means that were received by a network device; a destination address of the one or more packets of data originated by the packet generator means and transmitted by the network transmit interface means; and one or more qualities of service for the one or more packets of data originated by the packet generator means and transmitted by the network transmit interface means. The at least one of the ports further comprises a network receive interface means for receiving packets of data; and wherein the integrated circuit further comprises classifier means for identifying the packets of data that were received by the network receive interface means in reply to packets of data that were originated and transmitted by one of the port means in the integrated circuit, and counter means for counting a number of the packets of data received by the network receive interface means in reply to the one or more packets of data that were originated and transmitted by the one of the port means in the integrated circuit. The controller means determines a packet loss based on a number of the packets of data that were originated and transmitted by the one of the port means in the integrated circuit and the number of the packets of data received by the network receive interface means in reply to the one or more packets of data that were originated and transmitted by the one of the port means in the integrated circuit. The at least one of the port means further comprises: ingress queue means for storing the packets of data received by the network receive interface means. The at least one of the ports further comprises a network receive interface means for receiving packets of data; and wherein the integrated circuit further comprises classifier means for determining one or more properties of the packets of data received by the network receive interface means, and counter means for counting a number of packets of data received by the network receive interface means and having properties that match one or more property definitions. The at least one of the port means further comprises: ingress queue means for storing the packets of data received by the network receive interface means. The one or more property definitions comprise at least one of the group consisting of: a value for a field in the packets of data that indicates the packets of data were originated by one of the port means in the integrated circuit; and a value for a field in the packets of data that indicates the packets of data were originated by a port in another integrated circuit; and one or more qualities of service for the packets of data. The at least one of the port means: receives a request for the contents of the counter means; and transmits a packet of data comprises the contents of the counter means. A network switch comprises the integrated circuit. An Ethernet switch comprises the network switch. A network device comprises the integrated circuit. The network device further comprises: user interface means for providing the one or more packet definitions to the integrated circuit. A network device comprises the integrated circuit. The network device further comprises: user interface means for providing the one or more property definitions to the integrated circuit, and for retrieving the contents of the counter.

In general, in one aspect, the invention features a computer program for an integrated circuit comprising: causing the integrated circuit to transmit and receive packets of data on a plurality of ports of the integrated circuit; transferring the packets of data between the ports; receiving one or more packet definitions that specify characteristics of a packet; and originating one or more packets of data according to one or more of the packet definitions. The computer program further comprises: causing the one or more packets of data originated by the integrated circuit to be transmitted. The one or more packet definitions comprise at least one of the group consisting of: an address definition that specifies one or more addresses for the one or more packets of data; a load definition that specifies a number of the one or more packets of data; a protocol definition that specifies one or more network protocols for the one or more packets of data; a payload definition that specifies one or more data patterns for payloads of the one or more packets of data; a data rate definition that specifies one or more data rates at which the one or more packets of data are to be transmitted; and a quality of service definition that specifies one or more qualities of service for the one or more packets of data. The computer program further comprises: receiving one or more packets of data representing a number of the one or more packets of data originated and transmitted by the integrated circuit that were received by one or more network devices; and determining a packet loss based on a number of the one or more packets of data originated and transmitted by the integrated circuit and the number of the one or more packets of data originated and transmitted to the one or more network devices by the integrated circuit that were received by the one or more network devices. The computer program further comprises: determining the packet loss based on one or more properties of the one or more packets of data originated and transmitted by the integrated circuit. The one or more properties comprise at least one of the group consisting of: a source address of the packet of data representing the number of the one or more packets of data originated and transmitted by the integrated circuit that were received by a network device; a destination address of the one or more packets of data originated and transmitted by the integrated circuit; and one or more qualities of service for the one or more packets of data originated and transmitted by the integrated circuit. The computer program further comprises: receiving packets of data; and counting a number of the received packets of data that were received in reply to the one or more packets of data originated and transmitted by the integrated circuit. The computer program further comprises: determining a packet loss based on a number of the packets of data that were originated and transmitted by the integrated circuit and the number of received packets of data received in reply to the one or more packets of data originated and transmitted by the integrated circuit. The computer program further comprises: receiving packets of data; determining one or more properties of the received packets of data; and counting a number of the received packets of data having properties that match one or more property definitions. The one or more property definitions comprise at least one of the group consisting of: a value for a field in the packets of data that indicates the packets of data were originated by the integrated circuit; and a value for a field in the packets of data that indicates the packets of data were originated by another integrated circuit; and one or more qualities of service for the packets of data. The computer program further comprises: receiving a request for the number of packets of data received by the network receive interface that have properties that match the one or more property definitions; and causing the integrated circuit to transmit a packet of data comprises the number of packets of data received by the network receive interface that have properties that match the one or more property definitions.

In general, in one aspect, the invention features an integrated circuit comprising: one or more port means for transmitting and receiving packets of data; host interface means for transmitting and receiving the packets of data; controller means for receiving one or more packet definitions that specify characteristics of a packet; and wherein at least one of the port means comprises packet generator means for originating one or more packets of data according to one or more of the packet definitions received by the controller means.

Particular implementations can include one or more of the following features. The at least one of the port means further comprises: network transmit interface means for transmitting the one or more packets of data originated by the packet generator means. The at least one of the port means further comprises: egress queue means for storing the packets of data received by the at least one of the port means from the host interface means; test queue means for storing the packets of data originated by the packet generator means; and scheduler means comprises first input means for communicating with the egress queue means, second input means for communicating with the test queue means, and output means for communicating with the network transmit interface means. The one or more packet definitions comprise at least one of the group consisting of: an address definition that specifies one or more addresses for the one or more packets of data to be originated by the packet generator means; a load definition that specifies a number of the one or more packets of data to be originated by the packet generator means; a protocol definition that specifies one or more network protocols for the one or more packets of data to be originated by the packet generator means; a payload definition that specifies one or more data patterns for payloads of the one or more packets of data to be originated by the packet generator means; a data rate definition that specifies one or more data rates at which the one or more packets of data to be originated by the packet generator means are to be transmitted; and a quality of service definition that specifies one or more qualities of service for the one or more packets of data to be originated by the packet generator means. The at least one of the port means further comprises: network receive interface means for receiving one or more packets of data representing a number of the one or more packets of data originated by the packet generator means and transmitted by the network transmit interface means that were received by one or more network devices; and wherein the controller means determines a packet loss based on a number of the one or more packets of data originated by the packet generator means and transmitted by the network transmit interface means to the one or more network devices and the number of the one or more packets of data originated by the packet generator means and transmitted by the network transmit interface means that were received by the one or more network devices. The controller means determines the packet loss based on one or more properties of the one or more packets of data originated by the packet generator means and transmitted by the network transmit interface means. The one or more properties comprise at least one of the group consisting of: a source address of the packet of data representing the number of the one or more packets of data originated by the packet generator means and transmitted by the network transmit interface means that were received by a network device; a destination address of the one or more packets of data originated by the packet generator means and transmitted by the network transmit interface means; and one or more qualities of service for the one or more packets of data originated by the packet generator means and transmitted by the network transmit interface means. The at least one of the ports further comprises network receive interface means for receiving packets of data; and wherein the integrated circuit further comprises classifier means for identifying the packets of data that were received by the network receive interface means in reply to packets of data that were originated and transmitted by one of the port means in the integrated circuit, and counter means for counting a number of the one or more packets of data received by the network receive interface means in reply to the packets of data that were originated and transmitted by the one of the port means in the integrated circuit. The controller means determines a packet loss based on a number of the packets of data that were originated and transmitted by the one of the port means in the integrated circuit and the number of the packets of data received by the network receive interface means in reply to the one or more packets of data that were originated and transmitted by the one of the port means in the integrated circuit. The at least one of the port means further comprises: ingress queue means for storing the packets of data received by the network receive interface means. The at least one of the port means further comprises a network receive interface means to receive packets of data; and wherein the integrated circuit further comprises classifier means for determining one or more properties of the packets of data received by the network receive interface means, and counter means for counting a number of packets of data received by the network receive interface means and having properties that match one or more property definitions. The at least one of the port means further comprises: ingress queue means for storing the packets of data received by the network receive interface means. The one or more property definitions comprise at least one of the group consisting of: a value for a field in the packets of data that indicates the packets of data were originated by one of the port means in the integrated circuit; a value for a field in the packets of data that indicates the packets of data were originated by a port in another integrated circuit; and one or more qualities of service for the packets of data. The at least one of the port means: receives a request for the contents of the counter means; and transmits a packet of data comprises the contents of the counter means. A network interface controller (NIC) comprises the integrated circuit. A network device comprises the integrated circuit. The network device further comprises: user interface means for providing the one or more packet definitions to the integrated circuit. A network device comprises the integrated circuit. The network device further comprises: user interface means for providing the one or more property definitions to the integrated circuit, and for retrieving the contents of the counter means.

In general, in one aspect, the invention features a computer program for an integrated circuit comprising: causing the integrated circuit to transmit and receive packets of data on one or more ports of the integrated circuit; causing the integrated circuit to transmit and receive packets of data on a host interface of the integrated circuit; receiving one or more packet definitions that specify characteristics of a packet; and originating one or more packets of data according to one or more of the packet definitions.

Particular implementations can include one or more of the following features. The computer program further comprises: causing the integrated circuit to transmit the one or more packets of data on one or more of the one or more ports. The one or more packet definitions comprise at least one of the group consisting of: an address definition that specifies one or more addresses for the one or more packets of data; a load definition that specifies a number of the one or more packets of data; a protocol definition that specifies one or more network protocols for the one or more packets of data; a payload definition that specifies one or more data patterns for payloads of the one or more packets of data; a data rate definition that specifies one or more data rates at which the one or more packets of data are to be transmitted; and a quality of service definition that specifies one or more qualities of service for the one or more packets of data. The computer program further comprises: receiving one or more packets of data representing a number of the one or more packets of data originated and transmitted by the integrated circuit that were received by one or more network devices; and determining a packet loss based on a number of the one or more packets of data originated and transmitted to the one or more network devices by the integrated circuit and the number of the one or more packets of data originated and transmitted by the integrated circuit that were received by the one or more network devices. The computer program further comprises: determining the packet loss based on one or more properties of the one or more packets of data originated and transmitted by the integrated circuit. The one or more properties comprise at least one of the group consisting of: a source address of the packet of data representing the number of the one or more packets of data originated and transmitted by the integrated circuit that were received by a network device; a destination address of the one or more packets of data originated and transmitted by the integrated circuit; and one or more qualities of service for the one or more packets of data originated and transmitted by the integrated circuit. The computer program further comprises: receiving packets of data; and counting a number of the received packets, of data that were received in reply to the one or more packets of data originated and transmitted by the integrated circuit. The computer program further comprises: determining a packet loss based on a number of the packets of data that were originated and transmitted by the integrated circuit and the number of packets of data received in reply to the one or more packets of data originated and transmitted by the integrated circuit. The computer program further comprises: receiving packets of data; and determining one or more properties of the packets of data received by the integrated circuit, and counting a number of the packets of data received by the integrated circuit and having properties that match one or more property definitions. The one or more property definitions comprise at least one of the group consisting of: a value for a field in the packets of data that indicates the packets of data were originated by the integrated circuit; a value for a field in the packets of data that indicates the packets of data were originated by another integrated circuit; and one or more qualities of service for the packets of data. The computer program further comprises: receiving a request for the number of packets of data received by the integrated circuit that have properties that match the one or more property definitions; and causing the integrated circuit to transmit a packet of data comprises the number of packets of data received by the integrated circuit that have properties that match the one or more property definitions.

The details of one or more implementations are set forth in the accompanying drawings and the description below. Other features will be apparent from the description and drawings, and from the claims.

Figure 1:
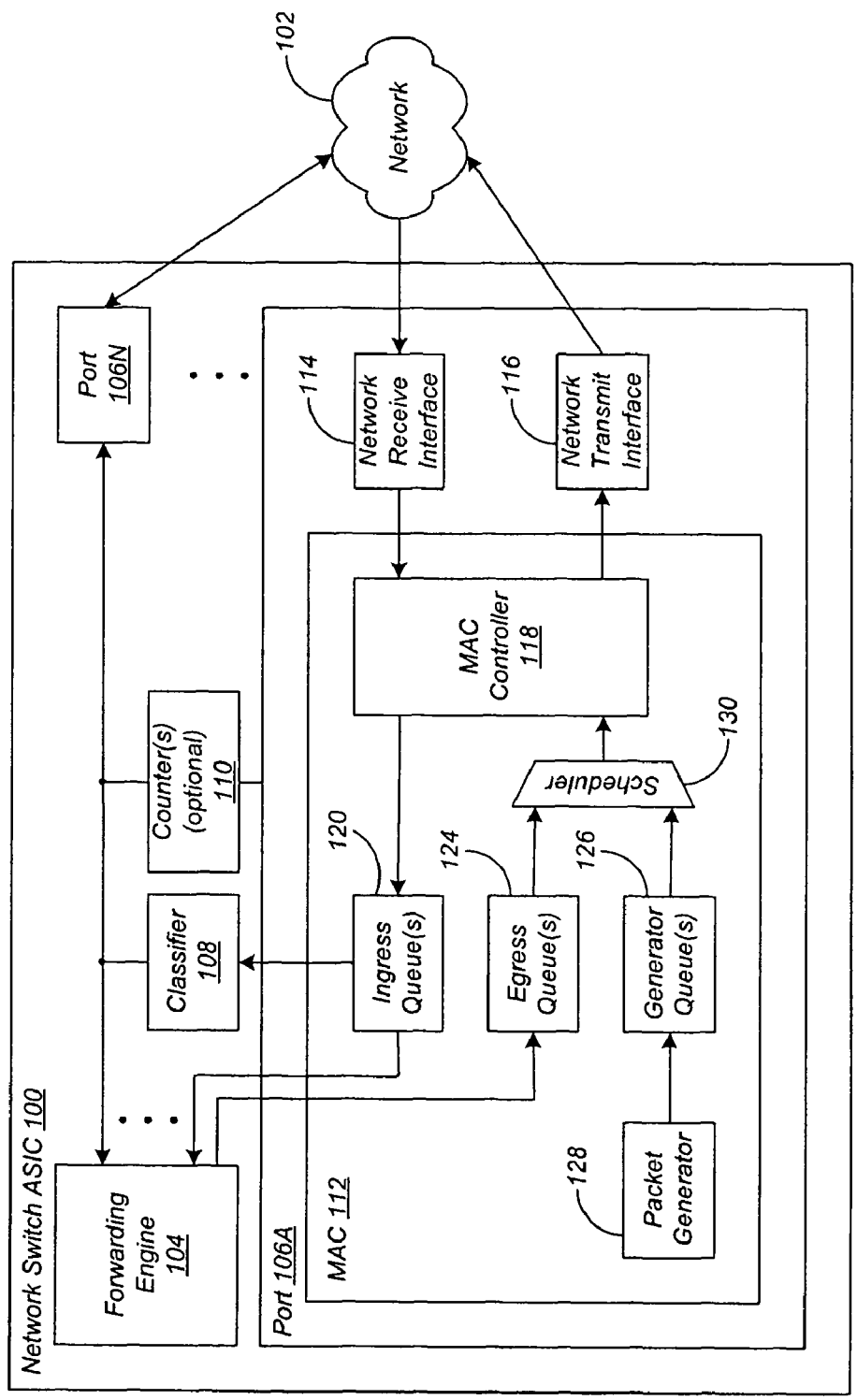
FIG. 1 shows a network switch application-specific integrated circuit (ASIC) in communication with a network according to a preferred embodiment of the present invention.

The leading digit(s) of each reference numeral used in this specification indicates the number of the drawing in which the reference numeral first appears.

DETAILED DESCRIPTION

Embodiments of the present invention provide integrated circuits that conduct network stress testing at the media access control (MAC) level and above. Because the testing occurs at the ASIC level, the CPUs in network devices employing integrated circuits according to the present invention are only minimally burdened by the testing.

Integrated circuits according to embodiments of the present invention can generate network traffic at wire speed, including specified high-level protocols and qualities of service. Integrated circuits according to embodiments of the present invention can also analyze network traffic, including traffic originated by embodiments of the present invention and traffic sent in reply to such traffic, including analysis of individual data flows and quality of service performance across the network.

The networks tested can include any sort of network such as wired, wireless, optical, and so on, and can range in scope from a single network device to very large networks comprising many network devices. While embodiments of the present invention are described with respect to a network switch embodiment and a network interface controller embodiment, it will be understood by those skilled in the relevant arts after reading this description that embodiments of the present invention can be implemented in other sorts of network devices as well, such as wireless access points, wireless clients, and the like.

FIG. 1 shows a network switch application-specific integrated circuit (ASIC) 100 in communication with a network 102 according to a preferred embodiment of the present invention. ASIC 100 comprises a forwarding engine 104 to transfer packets of data between a plurality of ports 106A through 106N, a classifier 108 to determine properties of packets received by ASIC 100, and one or more optional counters 110 to count packets. In some embodiments, some or all of the counters 110 are implemented within ports 106. Preferably ASIC 100 comprises various counters. Those on the port level simply count how many packets are received and sent. More sophisticated counters also on the port level can count certain type of packets based on low-level indications such as bad CRC, runt packets, packets too long, and the like. Each block comprises additional counters that can count the criteria supported by that block. For example, forwarding engine 104 comprises counters that can count how many packets have been received or sent on a specific route. As another example, classifier 108 comprises counters that count only packets belonging to a specific flow.

FIG. 1 also shows detail of one of the ports 106A, which comprises a media access controller (MAC) 112, a network receive interface 114 to receive packets of data from network 102, and a network transmit interface 116 to transmit packets of data to network 102. MAC 112 comprises a MAC controller 118, one or more ingress queues 120 to store packets received by port 106A from network 102, and one or more egress queues 122 to store packets to be transmitted by port 106A to network 102. In some embodiments, some or all of the functions of MAC controller 118 are implemented in a central controller in ASIC 100.

Port 106A also comprises a packet generator 128 to generate one or more packets according to one or more packet definitions that can be provided to ASIC 100, one or more generator queues 126 to store packets generated by packet generator 128, and a scheduler 130 to schedule packets in egress queues 124 and generator queues 126 for transmission to network 102. This arrangement permits ASIC 100 to conduct network testing while also handling regular network traffic.

Figure 2:
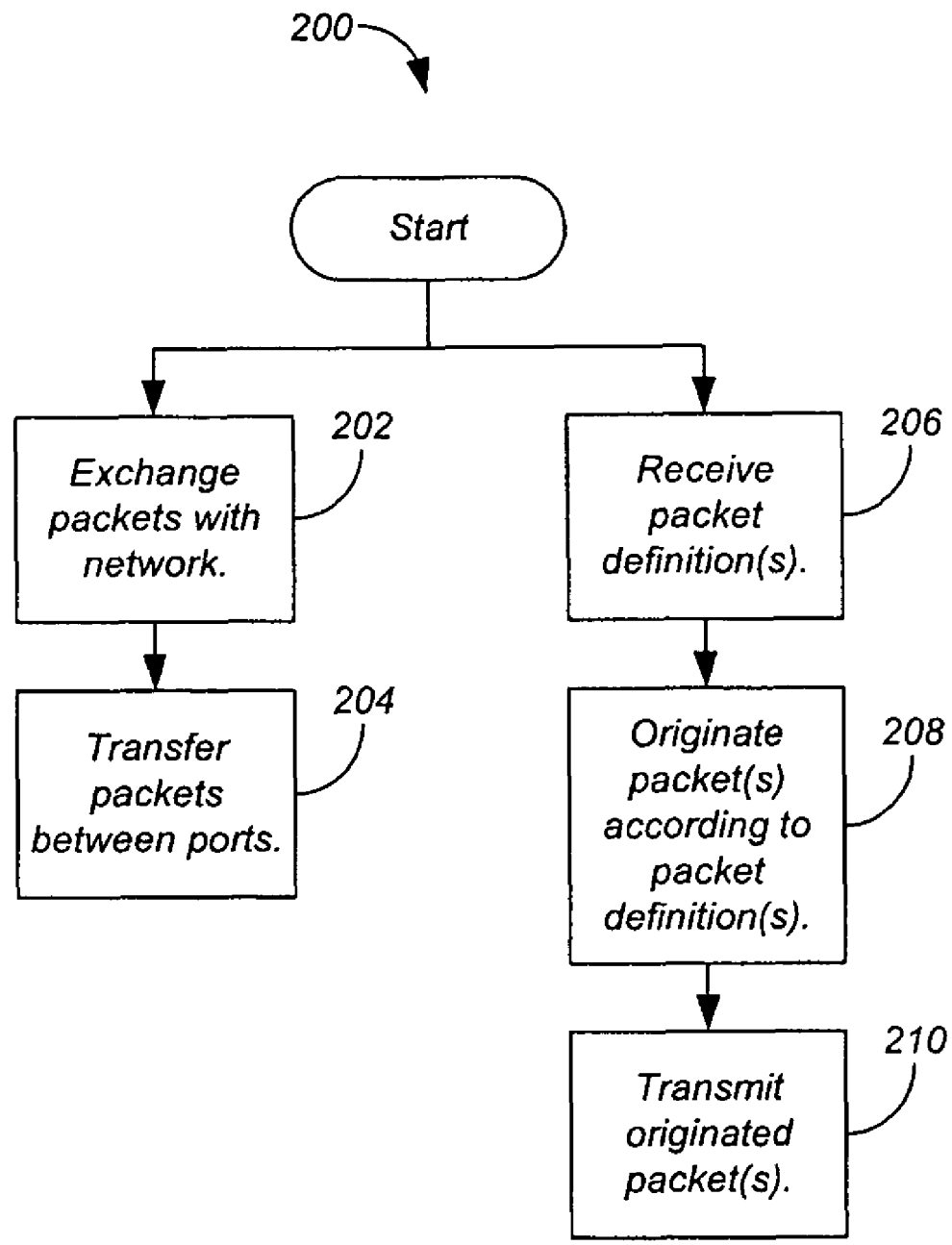
FIG. 2 shows a process for the ASIC of FIG. 1 according to a preferred embodiment.

FIG. 2 shows a process 200 for ASIC 100 of FIG. 1 according to a preferred embodiment. ASIC 100 operates as a network switch. Therefore ports 106 transmit and receive packets of data to and from network 102 (step 202) and forwarding engine 104 transfers the packets between ports 106 (step 204) according to methods well-known in the relevant arts.

Port 106A acts as a traffic generator to support network testing according to a preferred embodiment. MAC controller 118 receives one or more packet definitions (step 206), for example from a host CPU or in a packet from network 102. The packet definitions specify characteristics of the packets to be generated by port 106A. For example, the packet definitions can include an address definition that specifies one or more addresses, such as source and destination IP and MAC addresses, for the one or more packets of data to be originated by the packet generator, a load definition that specifies the number of packets to be generated, a target definition that specifies one or more destinations for the packets, a protocol definition that specifies one or more network protocols for the packets such as Open Shortest Path First Protocol (OSPF) and Routing Information Protocol (RIP), a payload definition that specifies one or more data patterns for payloads of the packets, a data rate definition that specifies one or more data rates at which the packets are to be transmitted, a quality of service definition that specifies one or more qualities of service for the packets, and the like.

Packet generator 128 originates one or more packets of data according to one or more of the packet definitions (step 208). Network transmit interface 116 transmits the one or more packets of data originated by the packet generator (step 210). As used herein, the terms "originate" and "originated" are used to indicate that the packets so described are packets that are generated by a packet generator 128 in a MAC 106, in contrast to packets that merely pass through a MAC 106, such as packets received from network 102 or forwarding engine 104.

This traffic generation function can be used to stress-test network 102 without burdening any CPU controlling ASIC 100. For example, in response to a packet definition provided by such a CPU, ASIC 100 can generate a specified number of packets at a specified data rate and quality of service comprising a specified payload and addressed to a specified network device. The only burden to the CPU is the time required to provide the packet definition.

Figure 3:
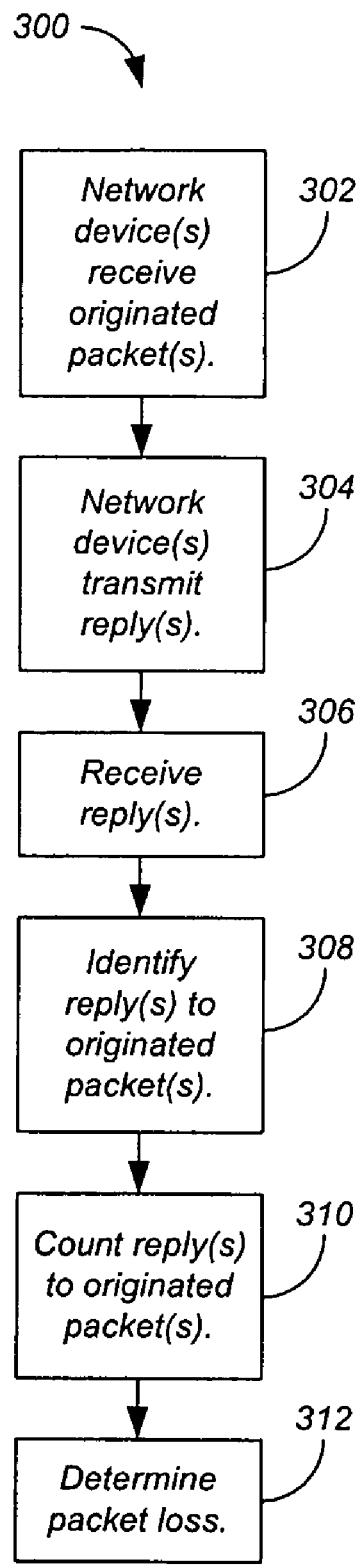
FIG. 3 shows a process for the ASIC of FIG. 1 to determine network throughput according to the two-way packet loss of the packets sent by the ASIC.

In some embodiments, ASIC 100 determines network throughput according to the two-way packet loss of the packets sent by ASIC 100, as shown in FIG. 3 as process 300. The packets originated and transmitted by port 106A are received by one or more network devices (step 302), which transmit replies to each of the packets (step 304).

Port 106A receives the reply packets (step 306) and stores them in ingress queues 120. Classifier 108 identifies the packets that were received in reply to the packets of data that were originated and transmitted by a port in ASIC 100 such as port 106A (step 308). Preferably classifier 108 is implemented according to a dual lookup for each packet, with one lookup to implement rules for handling test packets such as those received in reply to packets originated by a port 106 in an ASIC 100, and another lookup to implement rules for handling Access Control Lists and Quality of Service (QoS) rules for regular network traffic.

One or more of counters 110 counts the number of the packets received in reply to the packets that were originated and transmitted by one of the ports 106 in ASIC 100, such as port 106A (step 310). Controller 118 determines a packet loss based on the number of the packets that were originated and transmitted by one or more ports 106 in ASIC 100 and the number of packets received by ASIC 100 in reply to those packets (step 312).

Figure 4:
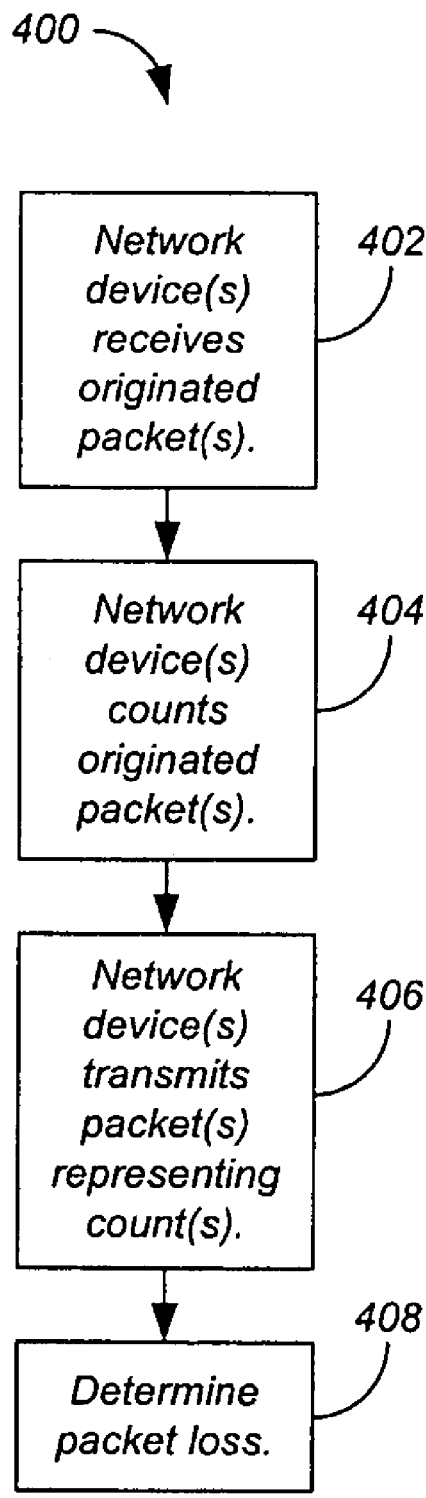
FIG. 4 shows a process for the ASIC of FIG. 1 to determine network throughput according to the one-way packet loss of the packets sent by the ASIC.

In some embodiments, ASIC 100 determines network throughput according to the one-way packet loss of the packets sent by ASIC 100, as shown in FIG. 4 as process 400. The packets originated and transmitted by port 106A are received by one or more network devices (step 402), which count the number of originated packets received (step 404) and transmit one or more packets to ASIC 100 representing those numbers (step 406).

Controller 118 determines the packet loss based on the number of packets of data originated by packet generator 128 and transmitted by network transmit interface 116 to the network devices and the number of those packets that were received by the network devices (step 408).

In some embodiments, the packet loss can be calculated based on a subset of the packets such as a specific data flow according to specified properties of the packets. For example, the packet loss determination can be limited to packets having one or more specified qualities of service, for example to verify the quality-of-service performance of network 102. Other example properties include source and destination addresses of the packets and the like.

Figure 5:
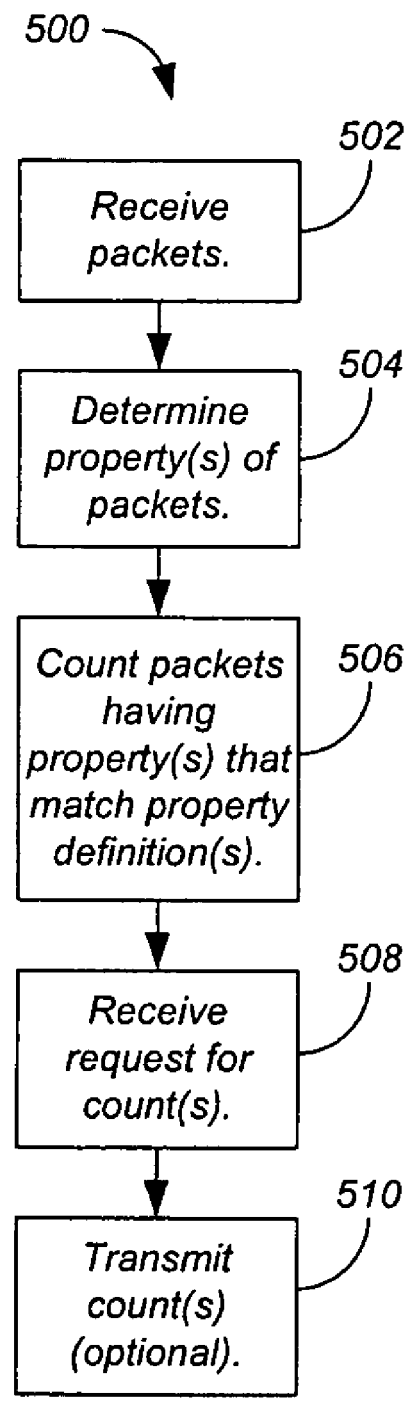
FIG. 5 shows a process for packet counting according to a preferred embodiment.

In some embodiments ASIC 100 also counts certain packets received from network 102, for example to support a packet loss calculation by another ASIC. FIG. 5 shows a process 500 for such packet counting according to a preferred embodiment. A port 106 in ASIC 100 receives a plurality of packets (step 502) and stores them in ingress queues 120. Classifier 108 determines one or more properties of the packets (step 504). Preferably classifier 108 is implemented according to a dual lookup for each packet, as described above.

One or more of counters 110 counts the number of received packets having properties that match one or more property definitions (step 506). The property definitions can include, for example, a value for a field in the packets that indicates the packets were originated by one of the ports 106 in ASIC 100, a value for a field in packets that indicates the packets were originated by a port in another ASIC, one or more qualities of service for the packets, and the like.

ASIC 100 optionally transmits the packet count in response to a request. ASIC 100 receives a request for the contents of one or more of counters 110 (step 508). In response, ASIC 100 transmits a packet of data comprising the contents of counter(s) 110 (step 510).

ASIC 100 can be implemented in a network device such as a network switch. The network switch can include a user interface to provide the one or more packet definitions and property definitions to ASIC 100, and to retrieve data from ASIC 100, such as the contents of counter(s) 110.

Figure 6:
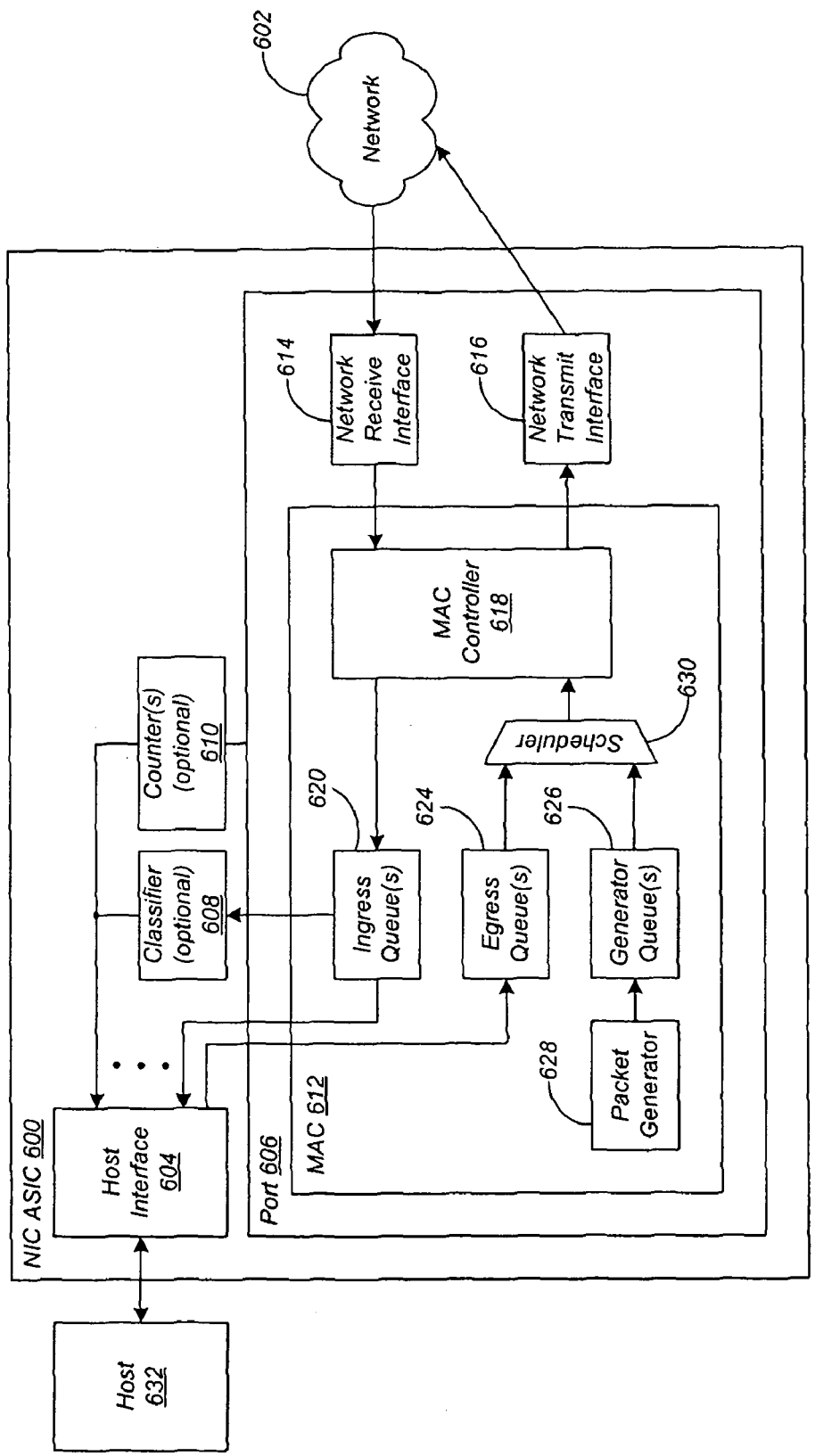
FIG. 6 shows a network interface controller ASIC in communication with a host and a network according to a preferred embodiment of the present invention.

FIG. 6 shows a network interface controller ASIC 600 in communication with a host 632 and a network 602 according to a preferred embodiment of the present invention. ASIC 600 comprises a host interface 604 to exchange packets of data with host 632, a port 606 to exchange packets of data with network 602, a classifier 608 to determine properties of packets received by ASIC 600, and one or more optional counters 610 to count packets. In some embodiments, some or all of the counters 610 are implemented within port 606.

FIG. 6 also shows detail of port 606, which comprises a media access controller (MAC) 612, a network receive interface 614 to receive packets of data from network 602, and a network transmit interface 616 to transmit packets of data to network 602. MAC 612 comprises a MAC controller 618, one or more ingress queues 620 to store packets received by port 606 from network 602, and one or more egress queues 622 to store packets to be transmitted by port 606 to network 602. In some embodiments, some or all of the functions of MAC controller 618 are implemented in a central controller in ASIC 600.

Port 606 also comprises a packet generator 628 to generate one or more packets according to one or more packet definitions that can be provided to ASIC 600 by host 632, one or more generator queues 626 to store packets generated by packet generator 628, and a scheduler 630 to schedule packets in egress queues 624 and generator queues 626 for transmission to network 602. This arrangement permits ASIC 600 to conduct network testing while also handling regular network traffic.

Figure 7:
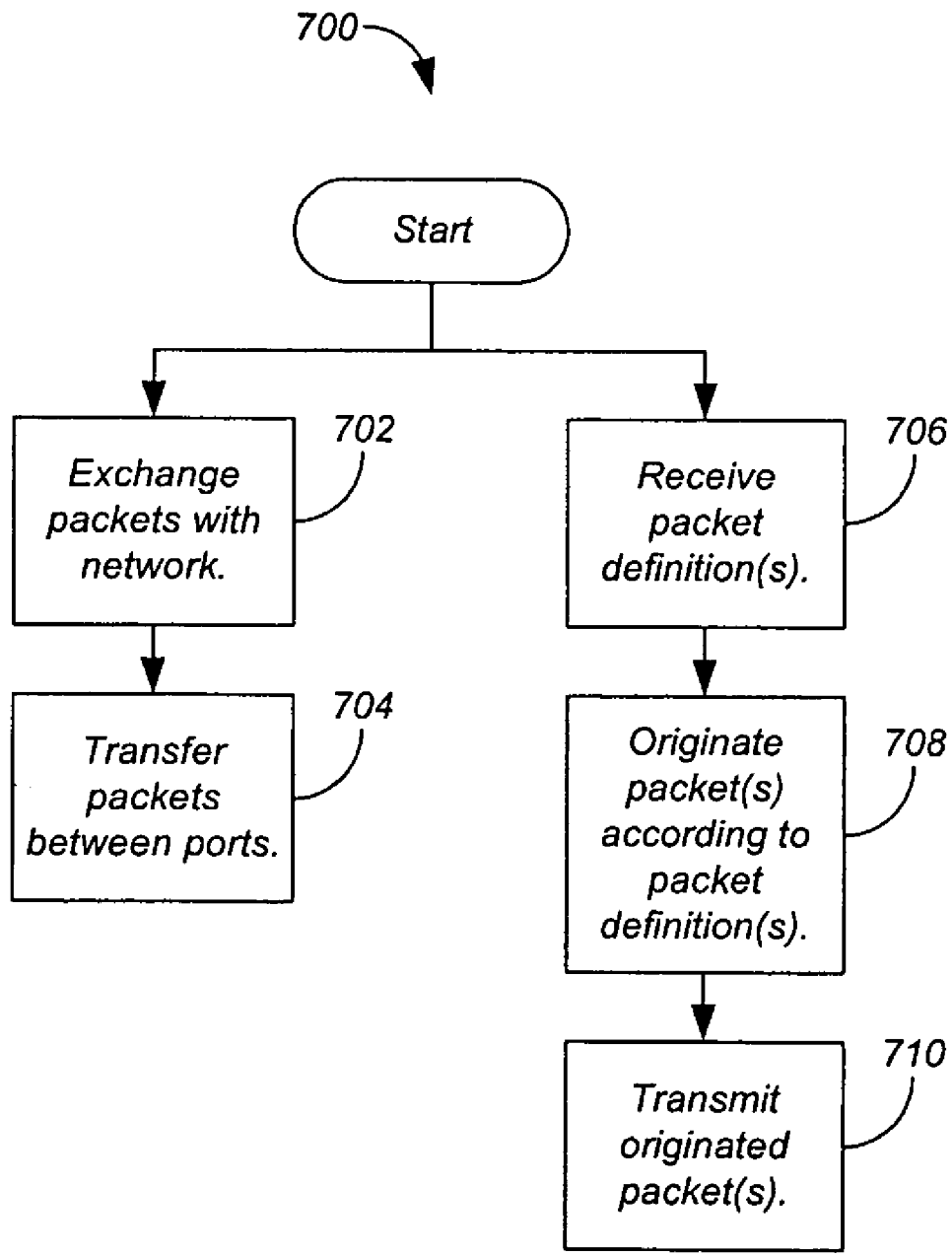
FIG. 7 shows a process for the ASIC of FIG. 6 according to a preferred embodiment.

FIG. 7 shows a process 700 for ASIC 600 of FIG. 6 according to a preferred embodiment. ASIC 600 operates as a network interface controller. Therefore port 606 transmits and receives packets of data to and from network 602 (step 702) and host interface 604 transfers the packets between port 606 and host 632 (step 704) according to methods well-known in the relevant arts.

Port 606 acts as a traffic generator to support network testing according to a preferred embodiment. MAC controller 618 receives one or more packet definitions (step 706), for example from a host CPU or in a packet from network 602. The packet definitions specify characteristics of the packets to be generated by port 606. For example, the packet definitions can include an address definition that specifies one or more addresses, such as source and destination IP and MAC addresses, for the one or more packets of data to be originated by the packet generator, a load definition that specifies the number of packets to be generated, a target definition that specifies one or more destinations for the packets, a protocol definition that specifies one or more network protocols for the packets such as Open Shortest Path First Protocol (OSPF) and Routing Information Protocol (RIP), a payload definition that specifies one or more data patterns for payloads of the packets, a data rate definition that specifies one or more data rates at which the packets are to be transmitted, a quality of service definition that specifies one or more qualities of service for the packets, and the like.

Packet generator 628 originates one or more packets of data according to one or more of the packet definitions (step 708). Network transmit interface 616 transmits the one or more packets of data originated by the packet generator (step 710). As used herein, the terms "originate" and "originated" are used to indicate that the packets so described are packets that are generated by a packet generator 628 in a MAC 606, in contrast to packets that merely pass through a MAC 606, such as packets received from network 602 or host interface 604.

This traffic generation function can be used to stress-test network 602 without burdening any CPU controlling ASIC 600. For example, in response to a packet definition provided by such a CPU, ASIC 600 can generate a specified number of packets at a specified data rate and quality of service comprising a specified payload and addressed to a specified network device. The only burden to the CPU is the time required to provide the packet definition.

Figure 8:
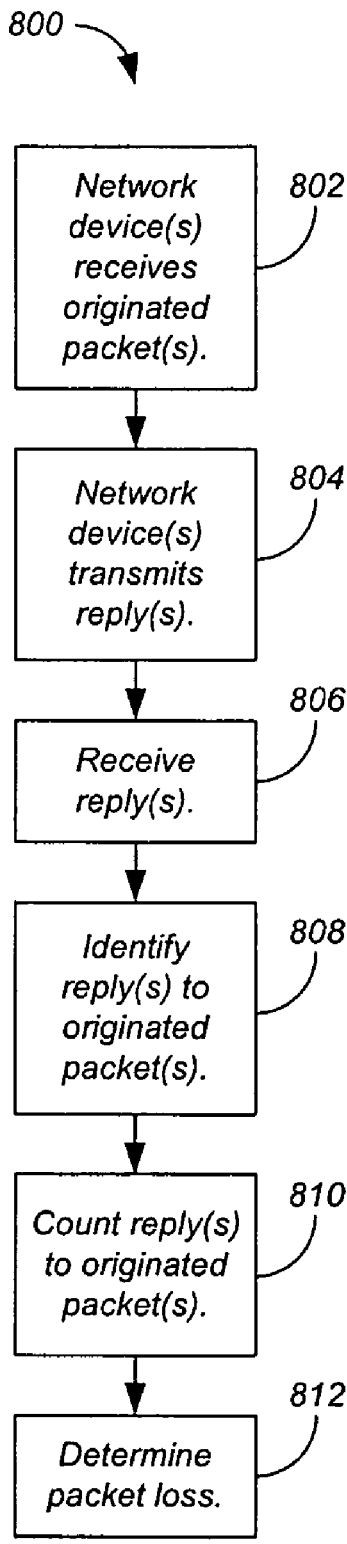
FIG. 8 shows a process for the ASIC of FIG. 6 to determine network throughput according to the two-way packet loss of the packets sent by the ASIC.

In some embodiments, ASIC 600 determines network throughput according to the two-way packet loss of the packets sent by ASIC 600, as shown in FIG. 8 as process 800. The packets originated and transmitted by port 606 are received by one or more network devices (step 802), which transmit replies to each of the packets (step 804).

Port 606 receives the reply packets (step 806) and stores them in ingress queues 620. Classifier 608 identifies the packets that were received in reply to the packets of data that were originated and transmitted by port 606 (step 808). Preferably classifier 608 is implemented according to a dual lookup for each packet, with one lookup to implement rules for handling test packets such as those received in reply to packets originated by a port 606 in an ASIC 600, and another lookup to implement rules for handling regular network traffic.

One or more of counters 610 counts the number of the packets received in reply to the packets that were originated and transmitted by one of the ports 606 in ASIC 600, such as port 606 (step 810). Controller 618 determines a packet loss based on the number of the packets that were originated and transmitted by port 606 in ASIC 600 and the number of packets received by ASIC 600 in reply to those packets (step 812).

Figure 9:
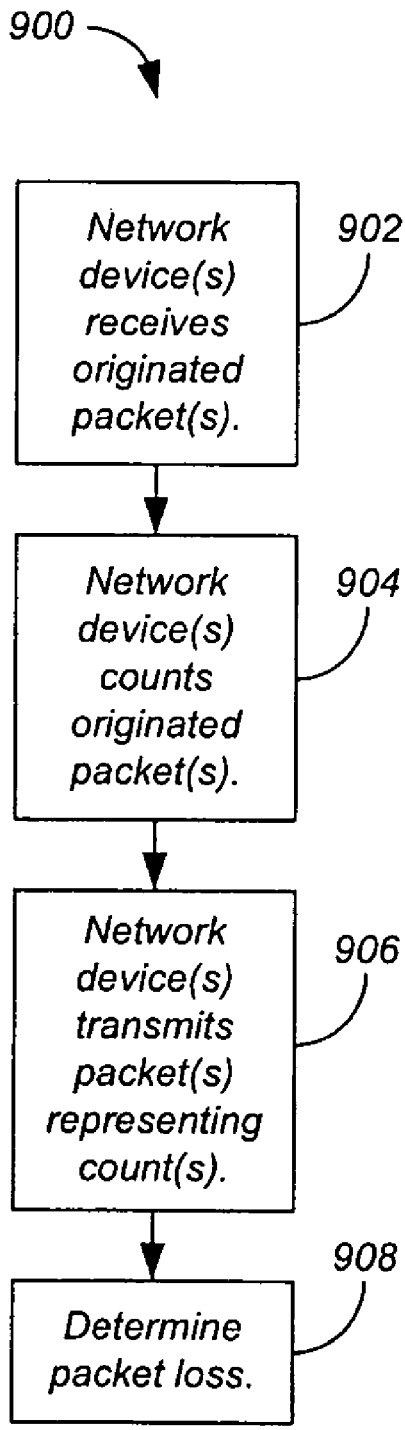
FIG. 9 shows a process for the ASIC of FIG. 6 to determine network throughput according to the one-way packet loss of the packets sent by the ASIC.

In some embodiments, ASIC 600 determines network throughput according to the one-way packet loss of the packets sent by ASIC 600, as shown in FIG. 9 as process 900. The packets originated and transmitted by port 606 are received by one or more network devices, which count the number of originated packets received and transmit one or more packets to ASIC 600 representing those numbers (step 902).

Controller 618 determines the packet loss based on the number of packets of data originated by packet generator 628 and transmitted by network transmit interface 616 to the network devices and the number of those packets that were received by the network devices (step 906).

In some embodiments, the packet loss can be calculated based on a subset of the packets such as a data flow according to specified properties of the packets. For example, the packet loss determination can be limited to packets having one or more specified qualities of service, for example to verify the quality-of-service performance of network 602. Other example properties include source and destination addresses of the packets and the like.

Figure 10:
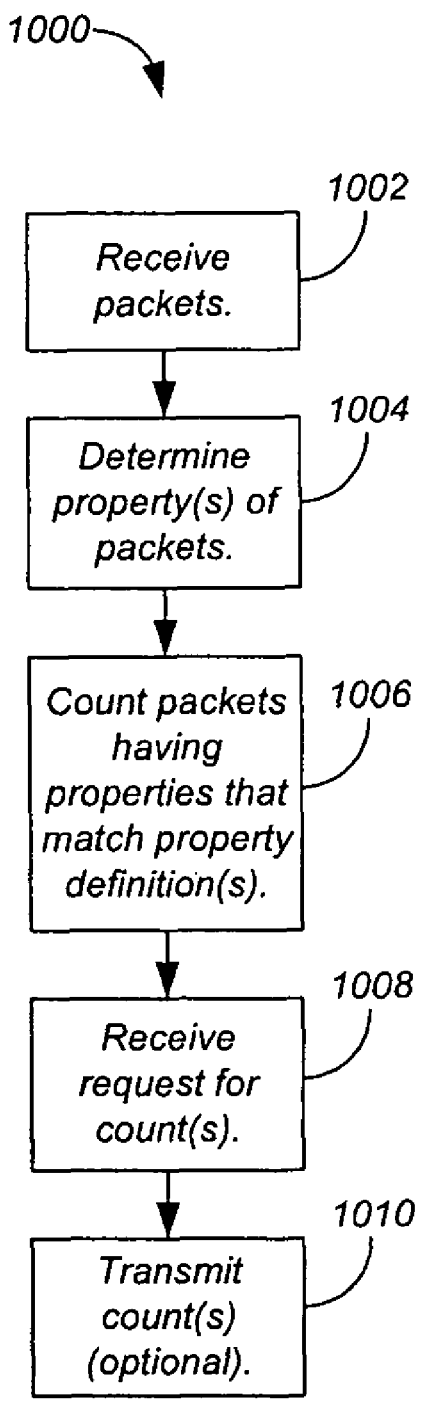
FIG. 10 shows a process for packet counting according to a preferred embodiment.

In some embodiments ASIC 600 also counts certain packets received from network 602, for example to support a packet loss calculation by another ASIC. FIG. 10 shows a process 1000 for such packet counting according to a preferred embodiment. Port 606 receives a plurality of packets (step 1002) and stores them in ingress queues 620. Classifier 608 determines one or more properties of the packets (step 1004). Preferably classifier 608 is implemented according to a dual lookup for each packet, as described above.

One or more of counters 610 counts the number of received packets having properties that match one or more property definitions (step 1006). The property definitions can include, for example, a value for a field in the packets that indicates the packets were originated by port 606 in ASIC 600, a value for a field in packets that indicates the packets were originated by a port in another ASIC, one or more qualities of service for the packets, and the like.

ASIC 600 optionally transmits the packet count in response to a request. ASIC 600 receives a request for the contents of one or more of counters 610 (step 1008). In response, ASIC 600 transmits a packet of data comprising the contents of counter(s) 610 (step 1010).

ASIC 600 can be implemented in a network device such as a network interface card. The network interface card can include a user interface to provide the one or more packet definitions and property definitions to ASIC 600, and to retrieve data from ASIC 600, such as the contents of counter(s) 610.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An integrated circuit of a first network device comprising:
    a plurality of ports to transmit and receive packets of data, and to receive one or more packet definitions that specify characteristics of a packet;
    a forwarding engine to transfer the packets of data between the ports; and
    a medium access controller (MAC) to receive the one or more packet definitions,
    wherein at least one of the ports comprises a packet generator to originate one or more test packets of data according to one or more of the packet definitions received from the MAC,
    wherein the integrated circuit receives the one or more packet definitions from a second network device in a network,
    wherein the first network device communicates with the second network device in the network,
    wherein a first port of the plurality of ports receives the packets of data and the one or more packet definitions,
    wherein the MAC separates the one or more packet definitions from the packets of data and forwards the packets of data to the forwarding engine and the packet definitions to the packet generator,
    wherein a second port of the plurality of ports of the integrated circuit transmits the packets of data to the network, and
    wherein the first port of the plurality of ports of the integrated circuit tests the network by transmitting the one or more test packets to the network.

2. The integrated circuit of claim 1, wherein the at least one of the ports further comprises: an egress queue to store the packets of data received by the at least one of the ports from the forwarding engine;
    a test queue to store the one or more test packets of data originated by the packet generator; and a scheduler comprising a first input in communication with the egress queue, a second input in communication with the test queue, and an output in communication with a network transmit interface.

3. The integrated circuit of claim 1, wherein the one or more packet definitions comprise at least one of:
an address definition that specifies one or more addresses for the one or more test packets of data to be originated by the packet generator;
a load definition that specifies a number of the one or more test packets of data to be originated by the packet generator;
a protocol definition that specifies one or more network protocols for the one or more test packets of data to be originated by the packet generator;
a payload definition that specifies one or more data patterns for payloads of the one or more test packets of data to be originated by the packet generator;
a data rate definition that specifies one or more data rates at which the one or more test packets of data to be originated by the packet generator are to be transmitted; and
a quality of service definition that specifies one or more qualities of service for the one or more test packets of data to be originated by the packet generator.

4. The integrated circuit of claim 1, wherein the at least one of the ports further comprises a network receive interface to receive one or more packets of data representing a number of the one or more test packets of data originated by the packet generator and transmitted by the network transmit interface and received by one or more network devices, and
wherein the controller determines a packet loss based on (i) a number of the one or more test packets of data originated by the packet generator and transmitted by the network transmit interface to the one or more network devices and (ii) the number of the one or more test packets of data originated by the packet generator and received by the one or more network devices.

5. The integrated circuit of claim 4, wherein the controller determines the packet loss based on one or more properties of the one or more test packets of data originated by the packet generator and transmitted by the network transmit interface.

6. The integrated circuit of claim 5, wherein the one or more properties comprise at least one of:
a source address of the packet of data representing the number of the one or more test packets of data originated by the packet generator and transmitted by the network transmit interface and received by a network device;
a destination address of the one or more test packets of data originated by the packet generator and transmitted by the network transmit interface; and
one or more qualities of service for the one or more test packets of data originated by the packet generator and transmitted by the network transmit interface.

7. The integrated circuit of claim 1:
wherein the at least one of the ports further comprises a network receive interface to receive packets of data; and
wherein the integrated circuit further comprises
a classifier to identify the packets of data received by the network receive interface in reply to packets of data originated and transmitted by one of the ports in the integrated circuit, and
a counter to count a number of the packets of data received by the network receive interface in reply to the one or more test packets of data originated and transmitted by the one of the ports in the integrated circuit.

8. The integrated circuit of claim 7, wherein the controller determines a packet loss based on (i) a number of the packets of data originated and transmitted by the one of the ports in the integrated circuit and (ii) the number of the packets of data received by the network receive interface in reply to the one or more packets of data originated and transmitted by the one of the ports in the integrated circuit.

9. The integrated circuit of claim 7, wherein the at least one of the ports further comprises an ingress queue to store the packets of data received by the network receive interface.

10. The integrated circuit of claim 1:
wherein the at least one of the ports further comprises a network receive interface to receive packets of data; and
wherein the integrated circuit further comprises
a classifier to determine one or more properties of the packets of data received by the network receive interface, and
a counter to count a number of packets of data received by the network receive interface and having properties that match one or more property definitions.

11. The integrated circuit of claim 10, wherein the at least one of the ports further comprises an ingress queue to store the packets of data received by the network receive interface.

12. The integrated circuit of claim 10, wherein the one or more property definitions comprise at least one of:
a value for a field in the packets of data that indicates the packets of data were originated by one of the ports in the integrated circuit;
a value for a field in the packets of data that indicates the packets of data were originated by a port in another integrated circuit; and
one or more qualities of service for the packets of data.

13. The integrated circuit of claim 10, wherein the at least one of the ports:
receives a request for contents of the counter; and
transmits a packet of data comprising the contents of the counter.

14. The network device of claim 10, further comprising: a user interface to provide the one or more property definitions to the integrated circuit, and to retrieve contents of the counter.

15. A network switch comprising the integrated circuit of claim 1.

16. An Ethernet switch comprising the network switch of claim 15.

17. The integrated circuit of claim 1, wherein the one or more packet definitions are independent of the packets of data.

18. The integrated circuit of claim 1, wherein the plurality of ports receive reply packets from the network that are generated based on the one or more test packets of data originated by the packet generator, and wherein the controller determines packet loss based on the reply packets.

19. The integrated circuit of claim 1, wherein the packets of data received by the plurality of ports and the one or more test packets of data originated by the packet generator are transmitted via the plurality of ports to the network.

20. The integrated circuit of claim 1, wherein the plurality of ports receive the one or more packet definitions from a network device that is remote from the integrated circuit.

21. The integrated circuit of claim 1, wherein the one or more packet definitions comprise:
an address definition that specifies one or more addresses for the one or more test packets of data originated by the packet generator; and
a load definition that specifies a number of the one or more test packets of data originated by the packet generator.

22. The integrated circuit of claim 1, wherein the one or more packet definitions comprise:
- a protocol definition that specifies one or more network protocols for the one or more test packets of data originated by the packet generator; and
- a payload definition that specifies one or more data patterns for payloads of the one or more test packets of data originated by the packet generator.

23. The integrated circuit of claim 1, wherein the one or more packet definitions comprise:
- a data rate definition that specifies one or more data rates at which the one or more test packets of data originated by the packet generator are transmitted; and
- a quality of service definition that specifies one or more qualities of service for the one or more test packets of data originated by the packet generator.

24. The integrated circuit of claim 1, wherein the plurality of ports transmit and receive data packets that are independent of the one or more test packets of data.

25. The integrated circuit of claim 1, wherein the one or more test packets of data are transmitted over the network via the plurality of ports to stress-test the network.

26. The integrated circuit of claim 1, wherein the plurality of ports receive the packet definitions from a host that is independent of the integrated circuit and generate the one or more test packets of data to test the network.

27. The integrated circuit of claim 1, wherein the plurality of ports receive and transmit packets of user data that are independent of the one or more test packets of data while generating the one or more test packets of data, and
- wherein the plurality of ports transmit the one or more test packets of data while transmitting the packets of user data.

28. The integrated circuit of claim 1, wherein the plurality of ports support testing of the network while transporting packets of user data.

29. The integrated circuit of claim 1, wherein the second network device commands the first network device to originate the one or more test packets of data by transmitting the one or more packet definitions to the first network device.

30. The integrated circuit of claim 1, wherein the first network device communicates wirelessly with the second network device.

31. The integrated circuit of claim 1, wherein the first network device tests the network between the first network device and the second network device based on the one or more test packets.

32. The integrated circuit of claim 1, wherein the plurality of ports transmit and receive at least one of the data packets while the one or more test packets of data are generated and transmitted.

33. The integrated circuit of claim 1, wherein the controller initiates testing of the network in response to wireless reception of the one or more packet definitions from the network via the one of the plurality of ports.

34. The integrated circuit of claim 33, wherein:
- the first network device is an end device for the one or more packet definitions; and
- at least one of the second network device and a third network device is an end device for receiving the one or more test packets.

35. The integrated circuit of claim 1, wherein the one or more packet definitions comprise:
- an address definition that specifies one or more addresses for the one or more test packets of data to be originated by the packet generator;
- a load definition that specifies a number of the one or more test packets of data to be originated by the packet generator;
- a protocol definition that specifies one or more network protocols for the one or more test packets of data to be originated by the packet generator;
- a payload definition that specifies one or more data patterns for payloads of the one or more test packets of data to be originated by the packet generator;
- a data rate definition that specifies one or more data rates at which the one or more test packets of data to be originated by the packet generator are to be transmitted; and
- a quality of service definition that specifies one or more qualities of service for the one or more test packets of data to be originated by the packet generator.

36. The integrated circuit of claim 1,
wherein the at least one of the ports further comprises a network receive interface to receive packets of data,
wherein the integrated circuit further comprises:
- a classifier to determine one or more properties of the packets of data received by the network receive interface; and
- a counter to count a number of packets of data received by the network receive interface and having properties that match one or more property definitions, and wherein the one or more property definitions comprise:
- a value for a field in the packets of data that indicates the packets of data were originated by one of the ports in the integrated circuit;
- a value for a field in the packets of data that indicates the packets of data were originated by a port in another integrated circuit; and
- one or more qualities of service for the packets of data.

37. A method for an integrated circuit of a first network device comprising:
- transmitting and receiving packets of data on a plurality of ports of the integrated circuit;
- transferring the packets of data between the ports;
- receiving, by a medium access controller (MAC), one or more packet definitions from one of the plurality of ports of the integrated circuit from a second network device in a network,
- wherein the one or more packet definitions specify characteristics of a packet;
- originating, by a packet generator, one or more test packets of data according to one or more of the packet definitions received from the MAC,
- wherein the first network device communicates with the second network device in the network;
- receiving the packets of data and the one or more packet definitions by a first port of the plurality of ports from the network;
- separating, by the MAC, the one or more packet definitions from the packets of data and forwarding the packets of data to the forwarding engine and the packet definitions to the packet generator;
- transmitting the packets of data to the network by a second port of the plurality of ports of the integrated circuit; and
- testing the network by the first port of the plurality of ports of the integrated circuit by transmitting the one or more test packets to the network.

38. The method of claim 37, wherein the one or more packet definitions comprise at least one of:
- an address definition that specifies one or more addresses for the one or more test packets of data;
- a load definition that specifies a number of the one or more test packets of data;

a protocol definition that specifies one or more network protocols for the one or more test packets of data;

a payload definition that specifies one or more data patterns for payloads of the one or more test packets of data;

a data rate definition that specifies one or more data rates at which the one or more test packets of data are to be transmitted; and a quality of service definition that specifies one or more qualities of service for the one or more test packets of data.

39. The method of claim 37, further comprising:

receiving one or more packets of data representing a number of the one or more test packets of data originated and transmitted by the integrated circuit and received by one or more network devices; and determining a packet loss based on a number of the one or more test packets of data originated and transmitted by the integrated circuit and the number of the one or more test packets of data originated and transmitted to the one or more network devices by the integrated circuit and received by the one or more network devices.

40. The method of claim 39, further comprising determining the packet loss based on one or more properties of the one or more test packets of data originated and transmitted by the integrated circuit.

41. The method of claim 40, wherein the one or more properties comprise at least one of:

a source address of the packet of data representing the number of the one or more test packets of data originated and transmitted by the integrated circuit and received by a network device;

a destination address of the one or more test packets of data originated and transmitted by the integrated circuit; and one or more qualities of service for the one or more test packets of data originated and transmitted by the integrated circuit.

42. The method of claim 37, further comprising:

receiving packets of data; and counting a number of the received packets of data received in reply to the one or more test packets of data originated and transmitted by the integrated circuit.

43. The method of claim 42, further comprising determining a packet loss based on a number of the packets of data that were originated and transmitted by the integrated circuit and the number of received packets of data received in reply to the one or more test packets of data originated and transmitted by the integrated circuit.

44. The method of claim 37, further comprising:

receiving packets of data;

determining one or more properties of the received packets of data; and counting a number of the received packets of data having properties that match one or more property definitions.

45. The method of claim 44, wherein the one or more property definitions comprise at least one of:

a value for a field in the packets of data that indicates the packets of data were originated by the integrated circuit; and a value for a field in the packets of data that indicates the packets of data were originated by another integrated circuit; and one or more qualities of service for the packets of data.

46. The method of claim 44, further comprising:

receiving a request for the number of packets of data received by the network receive interface that have properties that match the one or more property definitions; and transmitting a packet of data comprising the number of packets of data received by the network receive interface that have properties that match the one or more property definitions.

47. An integrated circuit of a network interface controller (NIC) comprising:

a plurality of ports on a host interface to transmit and receive packets of data, and one or more packet definitions that specify characteristics of a packet; and a medium access controller (MAC) to receive the one or more packet definitions, wherein at least one of the ports of the plurality of ports comprises a packet generator to originate one or more test packets of data according to one or more of the packet definitions received by the MAC, wherein the integrated circuit receives the one or more packet definitions and tests the network based on the one or more packet definitions received from the packet generator, wherein a first port of the plurality of ports of the integrated circuit receives the packets of data and the one or more packet definitions from the network, wherein the MAC separates the one or more packet definitions from the packets of data and forwards the packets of data to a forwarding engine and the packet definitions to the packet generator, wherein a second port of the plurality of ports transmits the packets of data to the network, wherein the first port of the plurality of ports tests the network by transmitting the one or more test packets to the network, and wherein the at least one of the plurality of ports further comprises a network receive interface having a counter to count a number of the one or more test packets of data received by the network receive interface in reply to the packets of data originated and transmitted by the one of the ports in the integrated circuit.

48. The integrated circuit of claim 47, wherein the at least one of the ports further comprises: an egress queue to store the packets of data received by the at least one of the ports from the host interface; a test queue to store the one or more test packets of data originated by the packet generator; and a scheduler comprising a first input in communication with the egress queue, a second input in communication with the test queue, and an output in communication with a network transmit interface.

49. The integrated circuit of claim 47, wherein the one or more packet definitions comprise at least one of:

an address definition that specifies one or more addresses for the one or more test packets of data to be originated by the packet generator;

a load definition that specifies a number of the one or more test packets of data to be originated by the packet generator;

a protocol definition that specifies one or more network protocols for the one or more test packets of data to be originated by the packet generator;

a payload definition that specifies one or more data patterns for payloads of the one or more test packets of data to be originated by the packet generator;

a data rate definition that specifies one or more data rates at which the one or more test packets of data to be originated by the packet generator are to be transmitted; and a quality of service definition that specifies one or more qualities of service for the one or more test packets of data to be originated by the packet generator.

50. The integrated circuit of claim 47, wherein the at least one of the ports further comprises a network receive interface to receive one or more packets of data representing a number of the one or more test packets of data originated by the packet generator and transmitted by the network transmit interface and received by one or more network devices, and wherein the controller determines a packet loss based on (i) a number of the one or more test packets of data originated by the packet generator and transmitted by the network transmit interface to the one or more network devices and (ii) the number of the one or more test packets of data originated by the packet generator and transmitted by the network transmit interface and received by the one or more network devices.

51. The integrated circuit of claim 50, wherein the controller determines the packet loss based on one or more properties of the one or more test packets of data originated by the packet generator and transmitted by the network transmit interface.

52. The integrated circuit of claim 51, wherein the one or more properties comprise at least one of:

a source address of the packet of data representing the number of the one or more test packets of data originated by the packet generator and transmitted by the network transmit interface and received by a network device;

a destination address of the one or more test packets of data originated by the packet generator and transmitted by the network transmit interface; and one or more qualities of service for the one or more test packets of data originated by the packet generator and transmitted by the network transmit interface.

53. The integrated circuit of claim 47, further comprises a classifier to identify the packets of data received by the network receive interface in reply to packets of data originated and transmitted by one of the ports in the integrated circuit.

54. The integrated circuit of claim 53, wherein the controller determines a packet loss based on (i) a number of the packets of data originated and transmitted by the one of the ports in the integrated circuit and (ii) the number of the packets of data received by the network receive interface in reply to the one or more test packets of data originated and transmitted by the one of the ports in the integrated circuit.

55. The integrated circuit of claim 53, wherein the at least one of the ports further comprises an ingress queue to store the packets of data received by the network receive interface.

56. The integrated circuit of claim 47, wherein the at least one of the ports further comprises an ingress queue to store the packets of data received by the network receive interface.

57. The integrated circuit of claim 47, wherein the one or more packet definitions comprise at least one of:

a value for a field in the packets of data that indicates the packets of data were originated by one of the ports in the integrated circuit;

a value for a field in the packets of data that indicates the packets of data were originated by a port in another integrated circuit; and one or more qualities of service for the packets of data.

58. The integrated circuit of claim 47, wherein the at least one of the ports:

receives a request for contents of the counter; and transmits a packet of data comprising the contents of the counter.

59. The network device of claim 47, further comprising a user interface to provide the one or more packet definitions to the integrated circuit.

60. The network device of claim 47, further comprising a user interface to provide the one or more packet definitions to the integrated circuit, and to retrieve contents of the counter.

61. The integrated circuit of claim 47, wherein the NIC transmits the one or more test packets to a network device via the network.

62. A method for an integrated circuit of a network interface controller (NIC) comprising:

transmitting and receiving packets of data on a host interface on one of a plurality of ports of the integrated circuit;

receiving, by a medium access controller (MAC) one or more packet definitions that specify characteristics of a packet on one of the plurality of ports of the integrated circuit;

originating, by a packet generator, one or more test packets of data according to one or more of the packet definitions received from the MAC;

testing a network based on the one or more packet definitions;

receiving the packets of data and the one or more packet definitions by a first port of the plurality of ports;

separating, by the MAC, the one or more packet definitions from the packets of data and forwarding the packets of data to a forwarding engine and the packet definitions to the packet generator;

transmitting the packets of data on the network by a second port of the plurality of ports;

testing the network by the first port of the plurality of ports by transmitting the one or more test packets on the network; and counting by a counter a number of the received packets of data received in reply to the one or more test packets of data originated and transmitted by the integrated circuit.

63. The method of claim 62, wherein the one or more packet definitions comprise at least one of:

an address definition that specifies one or more addresses for the one or more test packets of data;

a load definition that specifies a number of the one or more test packets of data;

a protocol definition that specifies one or more network protocols for the one or more test packets of data;

a payload definition that specifies one or more data patterns for payloads of the one or more test packets of data;

a data rate definition that specifies one or more data rates at which the one or more test packets of data are to be transmitted; and a quality of service definition that specifies one or more qualities of service for the one or more test packets of data.

64. The method of claim 62, further comprising:

receiving one or more packets of data representing a number of the one or more test packets of data originated and transmitted by the integrated circuit and received by one or more network devices; and determining a packet loss based on a number of the one or more test packets of data originated and transmitted to the one or more network devices by the integrated circuit and the number of the one or more test packets of data originated and transmitted by the integrated circuit and received by the one or more network devices.

65. The method of claim 64, further comprising determining the packet loss based on one or more properties of the one or more test packets of data originated and transmitted by the integrated circuit.

66. The method of claim 65, wherein the one or more properties comprise at least one of:
- a source address of the packet of data representing the number of the one or more test packets of data originated and transmitted by the integrated circuit and received by a network device;
- a destination address of the one or more test packets of data originated and transmitted by the integrated circuit; and
- one or more qualities of service for the one or more test packets of data originated and transmitted by the integrated circuit.

67. The method of claim 62, further comprising determining a packet loss based on a number of the packets of data originated and transmitted by the integrated circuit and the number of packets of data received in reply to the one or more test packets of data originated and transmitted by the integrated circuit.

68. The method of claim 62, further comprising:
- receiving packets of data; and
- determining one or more properties of the packets of data received by the integrated circuit, and
- counting a number of the packets of data received by the integrated circuit and having properties that match one or more property definitions.

69. The method of claim 68, wherein the one or more property definitions comprise at least one of:
- a value for a field in the packets of data that indicates the packets of data were originated by the integrated circuit;
- a value for a field in the packets of data that indicates the packets of data were originated by another integrated circuit; and
- one or more qualities of service for the packets of data.

70. The method of claim 68, further comprising:
- receiving a request for the number of packets of data received by the integrated circuit that have properties that match the one or more property definitions; and
- transmitting a packet of data comprising the number of packets of data received by the integrated circuit that have properties that match the one or more property definitions.

* * * * *